US010585610B1

(12) United States Patent
Wallace et al.

(10) Patent No.: US 10,585,610 B1
(45) Date of Patent: Mar. 10, 2020

(54) LOCKING DATA STRUCTURES WITH LOCKING STRUCTURES IN FLASH MEMORY BY SETTING BITS IN THE LOCKING STRUCTURES

(71) Applicant: EMC IP Holding Company LLC, Hopkinton, MA (US)

(72) Inventors: Grant R. Wallace, Pennington, NJ (US); Philip N. Shilane, Newtown, PA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 106 days.

(21) Appl. No.: 15/281,452

(22) Filed: Sep. 30, 2016

(51) Int. Cl.
*G06F 3/06* (2006.01)

(52) U.S. Cl.
CPC ............ *G06F 3/0637* (2013.01); *G06F 3/061* (2013.01); *G06F 3/0616* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 6,249,562 B1* | 6/2001 | Wells | ................. | H03K 21/403 377/109 |
| 6,883,026 B1* | 4/2005 | Onodera | ................. | G06F 9/52 707/999.008 |
| 2001/0000816 A1* | 5/2001 | Baltar | ................. | G06F 12/1433 711/103 |
| 2005/0138274 A1* | 6/2005 | Santis | ................. | G11C 16/22 711/103 |
| 2007/0186056 A1* | 8/2007 | Saha | ................. | G06F 9/466 711/144 |
| 2010/0083050 A1* | 4/2010 | Ohyama | ............. | G06F 11/1068 714/42 |
| 2011/0246727 A1* | 10/2011 | Dice | ................. | G06F 12/0261 711/150 |
| 2013/0232290 A1* | 9/2013 | Ish | ................. | G06F 12/0246 711/103 |
| 2014/0245103 A1* | 8/2014 | Torii | ................. | G06F 11/1068 714/758 |

* cited by examiner

*Primary Examiner* — Jared I Rutz
*Assistant Examiner* — Marwan Ayash
(74) *Attorney, Agent, or Firm* — Workman Nydegger

(57) ABSTRACT

Systems and methods for managing content in a flash memory. A locking data structure is used to control access to data structures and the locking data structure is implemented in flash memory. The locking data structure is updated by overwriting the data such that the associated data structure is identified as locked or unlocked.

20 Claims, 8 Drawing Sheets

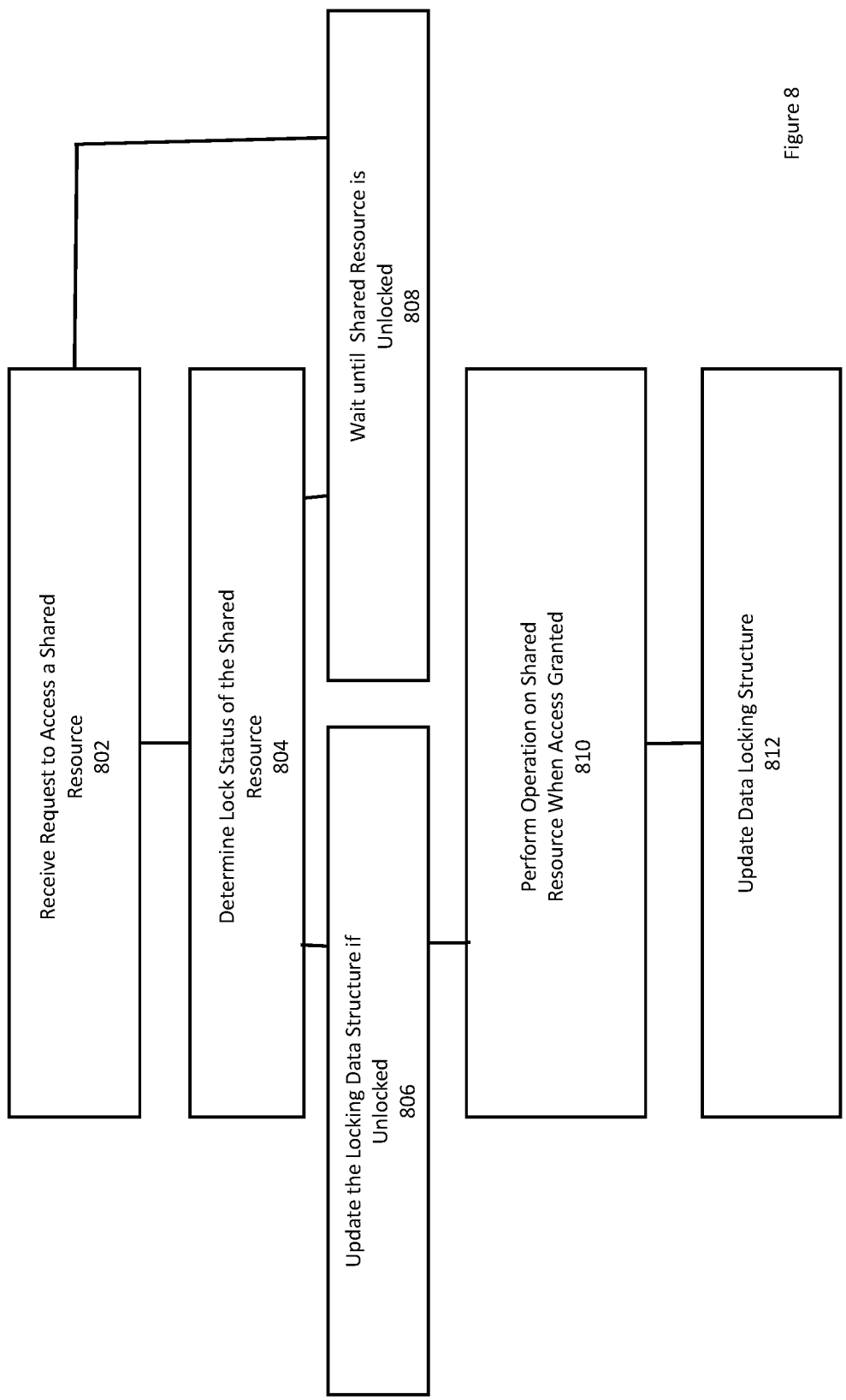

LOCKING DATA STRUCTURES WITH LOCKING STRUCTURES IN FLASH MEMORY BY SETTING BITS IN THE LOCKING STRUCTURES

FIELD OF THE INVENTION

Embodiments of the invention relate to systems and methods for processing large datasets. More particularly, embodiments of the invention relate to data structures in flash memory and to systems and methods for implementing locking data structures in flash memory.

BACKGROUND

As the amount of data in computing systems continues to increase, there is a strong desire for improvements that allow datasets to be efficiently processed. DRAM (Dynamic Random Access Memory) and the like are often too small to efficiently process large data sets. Algorithms that process data out-of-core (e.g., using Hard Disk Drives (HDDs)) tend to be slow.

One potential solution is to introduce flash memory into the computing systems. Flash memory is faster than HDDs and has the capacity to accelerate dataset analysis. Even though flash memory can improve the processing capability of the computing systems, flash memory has several problems that impact performance.

Conventional data structures are designed assuming that random changes or random edits can be performed quickly and without penalty. In contrast, there is a penalty associated with small edits or changes in a flash memory. Small edits in a flash memory require the entire edited page to be copied forward to a new page. The previous page must be eventually erased before it can be reused. More specifically, data in a used area or page of a conventional flash memory cannot be simply changed to a new value. Rather, it is necessary to erase the entire page before writing the data to the page. This is the reason that small edits to a page in the flash memory are performed by writing the data to a new page. It then becomes necessary to erase the old page.

This process causes both a performance penalty and a lifespan penalty. This process results in multiple reads and writes (thus the performance penalty). The lifespan penalty occurs because flash memory can only be written or erased a limited number of times before wearing out. Further, flash memory is typically erased in large units.

This creates additional problems when implementing data structures in the flash memory. Every time a change is made to data that is stored in the data structure, there is a potential for multiple writes and erasures.

In addition, many computing systems and applications support concurrently executing applications or threads. To prevent two applications or threads from accessing the same data structure at the same time, it is necessary to ensure that only one application or thread has access to the data structure at a time. This is achieved using a lock in some systems. Unfortunately, a conventional lock in flash memory is subject to the same performance and lifespan penalties as other data structures. Each change to the lock would effectively require the entire lock to be recreated at another location in the flash memory. Systems and methods are needed to improve the performance of flash memory and to improve the lifespan of the flash memory and to effectively implement data structures in a flash memory.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which:

FIG. 8 illustrates an example of a flow diagram for locking a shared resource with a locking data structure in a flash memory.

DETAILED DESCRIPTION OF SOME EXAMPLE EMBODIMENTS

Figure 1:
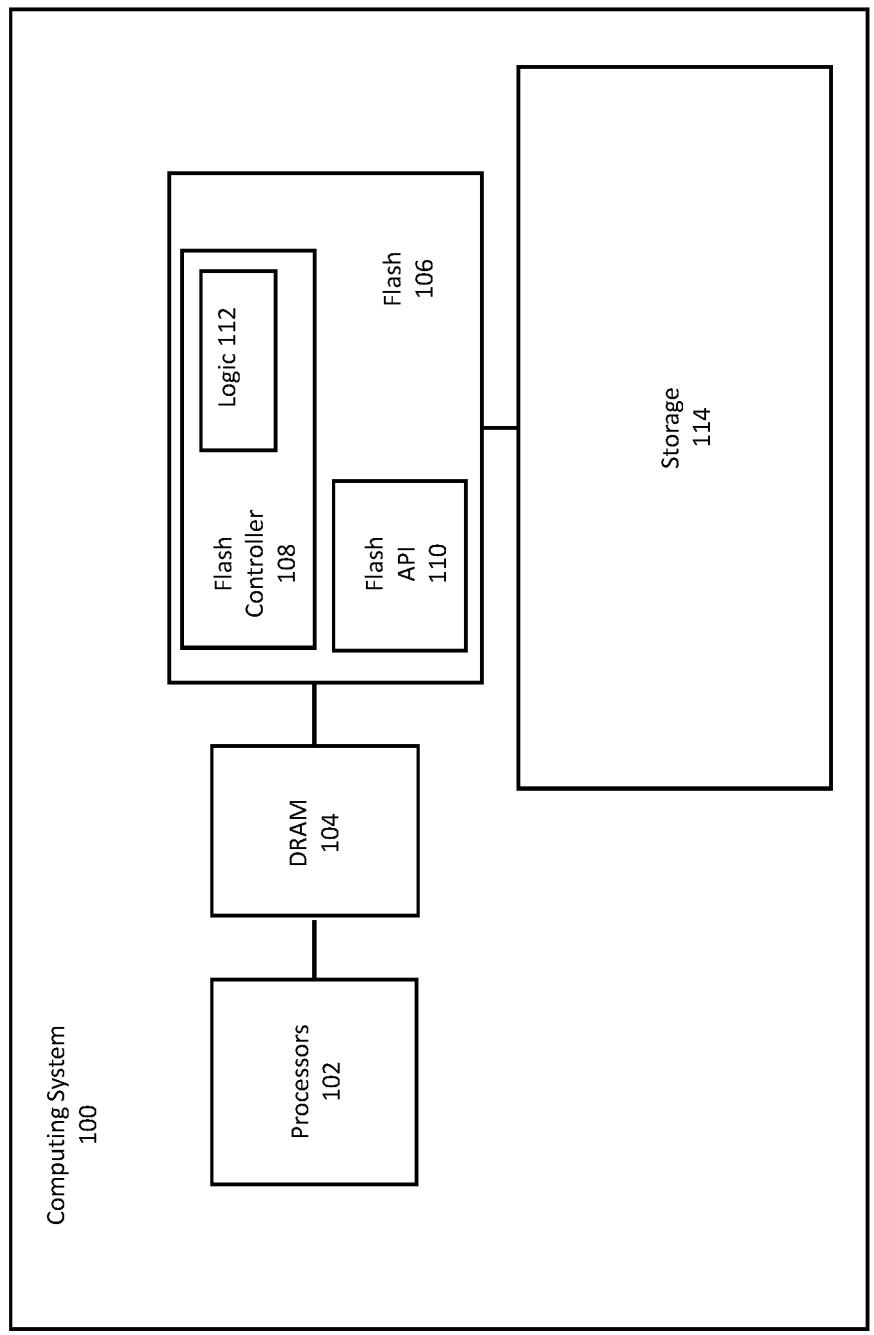
FIG. 1 illustrates an example of a computing system that is configured to perform overwrites in a flash memory.

Embodiments of the invention relate to systems and methods for processing large datasets. Embodiments of the invention further relate to systems and methods for processing large datasets in a flash memory (e.g., SSD (solid state drive)). Embodiments of the invention further relate to systems and methods for controlling or managing flash memory and to interfacing with flash memory. Embodiments of the invention further relate to data structures in a flash memory. Embodiments of the invention further relate to systems and methods for implementing locking data structures in a flash memory. Locking data structures can be used to control access to resources including shared resources such as data, switches, network interfaces, or the like.

In a conventional flash memory, the ability to set a bit (i.e., change from a logical 0 to a logical 1) may be supported at the bit level. However, changing a bit from a logical 1 to a logical 0 (unset the bit) is not supported at this level (e.g., the bit level). Rather, it is necessary to erase a larger unit in the flash memory in order to unset bits. By way of example, flash memory may be erased in 1 megabyte units. As a result, it is not generally possible to overwrite existing data in flash. Instead, new data is written to a new location (which may have been previously erased) and the old location is marked for erasure. Embodiments of the invention enable overwrites of existing data in some instances and in various data structures. Embodiments of the invention allow data structures to be implemented in flash while reducing the number of associated erasures by overwriting some of the data in the data structures.

A flash memory may include a controller and an interface (e.g., API (application programming interface) or other interface) associated with the flash memory controller. In one example, the logic of the flash memory controller is configured to perform writes to existing data (overwriting the existing data) rather than write the data to a new location and mark the old location for deletion. If necessary, the controller may cause the data to be simply written to a new location. For an overwrite operation, the controller may initially read the version of the page or block being written (i.e., the copy in the flash memory). If the changes being written only result in the setting of more logical 1s (e.g., changing 0s to 1s), then the existing page or block can be overwritten. If some bits need to be unset (changed from is to 0s) in the flash memory, then the write may be performed normally to a new page and the old page is marked for erasure. During this process (read-check-overwrite), the affected page or block may be locked.

In another example, an overwrite can be achieved using calls to a flash memory API. Calls include, by way of example, a logical-OR and a Compare-and-Swap.

During a logical-OR call, a client may provide a block of data and an address. The page (or pages depending on the size of the block of data) at that address is modified to the logical OR of its current contents with the provided block. This only requires setting additional bits. As a result, an overwrite may be performed on the current page or pages without the need to write to a new page or pages. The logical OR changes 0s in the target block that correspond to is in the new data to be set. It may not be necessary to perform an OR operation for each bit in the overwrite operation. It may only be necessary to identify the 0s that need to be changed to 1s.

An overwrite may occur in flash memory by performing a logical OR operation. This operation ensures that 1s located in a target block are unaffected while 0s are potentially changed to 1s. The change occurs when the data being overwritten to the target block contains a 1 where the target block contains a 0. A logical OR operation between bits A and B has the possible outcomes:

| A | B | OR Result |
|---|---|---|
| 0 | 0 | 0 |
| 0 | 1 | 1 |
| 1 | 0 | 1 |
| 1 | 1 | 1 |

A Compare-and-Swap call may be used for locking and thread synchronization when performing overwrites. In a compare-and-swap call, a client provides the new version of the block. Alternatively, the client may provide both the previous version of the block and the new version of the block. The flash memory, in response to the call, may atomically read the page or block and compare the read page/block with the previous version provided by the client. If the previous version provided by the client matches the page/block read from the flash memory, then the page/block is overwritten with the new version provided by the client in the call using, for example, a logical OR. Other compare-and-swap operations to the same page are blocked until the current call completes. The block of data may also be locked using a locking data structure.

Embodiments of the invention may implement data structures in the flash memory such that the data structure can be updated using overwrites. This prolongs the life of the flash memory by limiting or reducing the number of erasures and can improve the performance of the flash memory. Examples of data structures include, but are not limited to, bloom filters, linked lists, hash tables, locking data structures, trees, graphs, and the like or combinations thereof.

FIGS. 1-4 describe a flash memory and examples of logic and calls that may be used to perform an overwrite. FIG. 1 illustrates an example of a computing system that includes a flash memory and that enables pages to be overwritten from an internal perspective and an external perspective. Overwrites to existing pages (without erasing the data first) can be achieved using internal logic. An external interface, which provides access to an API, allows similar abilities to be invoked by a client. As discussed herein, changing a bit from 0 to 1 is setting a bit and changing a bit from 1 to 0 is unsetting a bit. Unsetting bits can typically only be performed by erasing an erasure unit at a time and an erasure unit may include multiple pages.

FIG. 1 illustrates a computing device or system 100 that includes processor(s) 102, DRAM 104, flash memory 106, and storage 114. The computing system 100 may be configured to provide computing services such as backup services, document management, contact management, or the like. The computing system 100 can be formed of network connected devices or may be implemented as an integrated device. The computing system 100 can be connected to a computing network.

The storage 114 may include various hardware storage devices (e.g., magnetic, optical, etc.) such as HDDs. The storage 114 can be arranged in different manners and may include multiple devices. The DRAM 104 and the flash 106 can be used as caches in the computing system 100. The DRAM, which is the fastest memory, is typically smaller than the flash memory 106. The flash memory 106 is typically smaller than the storage 114. In other embodiments, the flash 106 may be the primary storage and the storage 114 could be omitted. The flash memory 106 can be large (e.g., terabytes or larger). The computing system 100 may be configured for processing large data sets such as backup data, data lake data, or the like.

The flash memory 106 is associated with a flash controller 108 and a flash API 110. The flash controller 108 typically controls operations occurring within the flash 106 and may include its own processor and memory and other circuitry. The flash API 110 allows clients to make specific calls to the flash memory 106, which may be executed by the flash controller 108. The client may be any device or component (e.g., processor, memory controller, process) that interacts with the flash memory 106.

The flash controller 108 is associated with logic 112 that may be configured to interact with or perform operations on the data stored in the flash memory 106. The logic 112, for example, may perform overwrites, reads, moves, copies, inserts, logical-ORs, compare-and-swaps, erasures, or the like.

Figure 2:
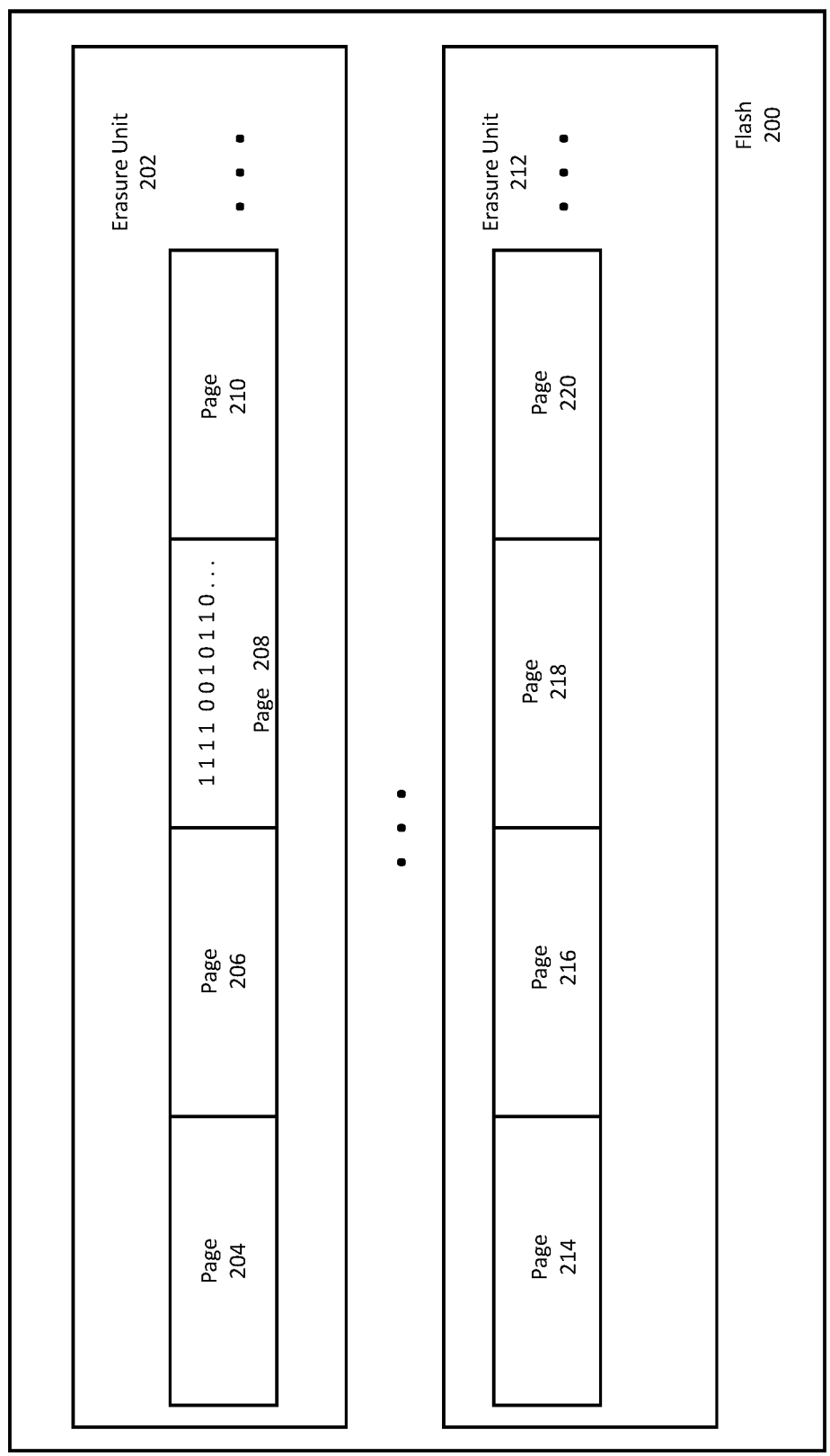
FIG. 2 illustrates an example of a flash memory that is configured to perform overwrites.

FIG. 2 illustrates an example of a flash memory and illustrates how data may be arranged in the flash memory. FIG. 2 illustrates a flash memory 200, which is an example of the flash memory 106 shown in FIG. 1. The flash memory 200 includes erasure units, such as erasure units 202 and 212. Each erasure unit is associated with pages. Pages 204, 206, 208, and 210 are associated with the erasure unit 202 and the pages 214, 216, 218, and 220 are associated with the erasure unit 212. One of skill in the art can appreciate that the flash memory is typically much larger than illustrated. Further, the size of the erasure unit 212 can be set by default or may be changed.

The pages 204, 206, 208, and 210 are smaller than the erasure unit 202. By way of example only, the pages 204, 206, 208, and 210 may be 4 KB each. The erasure units 202 and 212 may be 1 MB each. Data stored in the flash memory 200 may also be arranged in containers or using other storage arrangements. However, when data is written to the flash memory 200, the data is written in pages and the pages are usually written in sequence in some embodiments. Other memory configurations are within the scope of embodiments of the invention.

In order to overwrite a page in a conventional flash, it is necessary to erase all pages in the erasure unit before writing the pages in the newly erased erasure unit or write the new page to a new location. For example, the page 208 includes data. Because the page 208 contains data, a conventional flash cannot simply write new data to the page 208. Rather, it is necessary to erase all pages 204, 206, 208, and 210 in the erasure unit 202 before new data can be written to the page 208. Thus, all pages in the erasure unit 202 would be erased. The new data could alternatively be written to a new location and the existing page or erasure unit marked for erasure.

Embodiments of the invention, in contrast, allow data to be written to the page 208 by performing an overwrite operation. In particular, embodiments of the invention allow data to be written to the page 208 or any other page in the erasure unit 202 (or more generally in the flash memory) as long as the write makes no changes that cause specific cells (or bits) to become unset, but only changes 0s to 1s. This is because the flash memory 200 may allow more electrons to be stored in an individual cell (representing one bit) thus semantically changing the value from 0 to 1. Reducing the electrons to change a 1 to a 0, however, involves erasing an entire erasure unit due to the hardware constraints. Thus, data such as 0000 can be overwritten to become 0101 because only 0s are being changed to 1s. An overwrite is not permitted when attempting to change 1110 to 0010 because this involves changing is to 0s which is not supported for this type of flash memory. In this case when changing is to 0s, it may be necessary to follow conventional flash memory writing procedures, which may involve writing the data to a new page and erasing the pages in the erasure unit.

Figure 3:
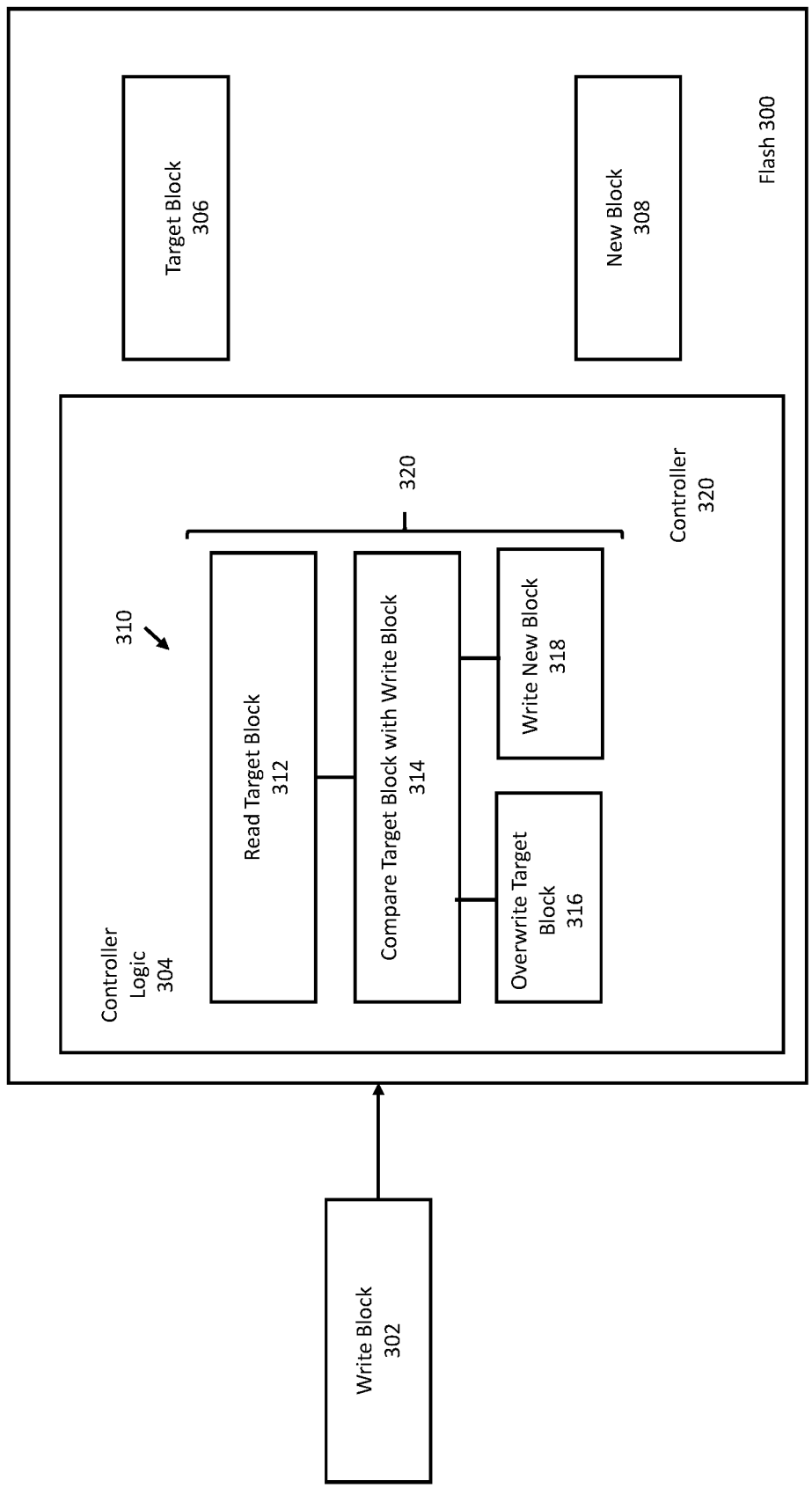
FIG. 3 illustrates an example of internal logic for overwriting portions of a flash memory.

FIG. 3 illustrates an example of a flash memory that includes a controller and illustrates an example of logic associated with performing an overwrite in the flash memory. FIG. 3 illustrates that the flash memory 300 may receive a write block 302 from a client (e.g., a thread, process, or the like). When the write block 302 is received, the controller may perform controller logic 304 to perform the write operation in the flash memory 300.

The write operation may include performing a method 310. The write block 302 may write to or correspond to more than one page in the flash memory 300. In box 312, the controller 320 may read the target block 306. The target block 306 may be, by way of example, a previous version of the write block 302. The target block 306 may be located at a destination address included in the write request received along with the write block 302.

After reading the target block 306, the controller 320 may compare the target block 306 with the write block 302. The result of the comparison determines, in one example, whether the target block 306 can be overwritten with the write block 302 or whether the write block is written to a new location as the new block 308. The comparison may identify which bits need to be changed from 0s to 1s.

In one example, if the comparison in box 314 determines that writing the write block 302 to the target block 306 would only set bits from 0s to 1s, then the target block 306 is overwritten with the write block 302 in box 316. If the comparison determines that it is necessary to reset is to 0s, then the write block 302 is written to a new location as the new block 308 in box 318. The target block 306 may be marked for deletion or erasure.

In one example, the reason it works to write either to target block 306 or to new block 308 is that flash controllers may include a flash translation layer (FTL) that maps from logical to physical address. A client may think that they are writing to a logical address 10, which the FTL has previously mapped to physical address 306. If 306 can be written only by setting additional 0s to 1s, then the write takes place and the FTL remains unchanged. If instead, 1s need to be changed to 0s, then the write is directed to the new block 308, the FTL is updated to map from logical address 10 to physical address 308 and physical address 306 is marked for deletion or erasure.

The logic performed in the method 310 is internal to the flash memory 300 in this example. The client associated with the write operation may not be aware of the overwrite method performed in the flash memory 300.

During the method 310 and in particular while reading the target block, comparing the target block with the write block and overwriting the target block, the page or pages associated with the target block are locked at 320 so that another client does not interfere with the method 310. A lock may be used during the overwrite method 310. The controller 320 may set aside some memory to track which regions of the flash memory 300 are locked.

Figure 4:
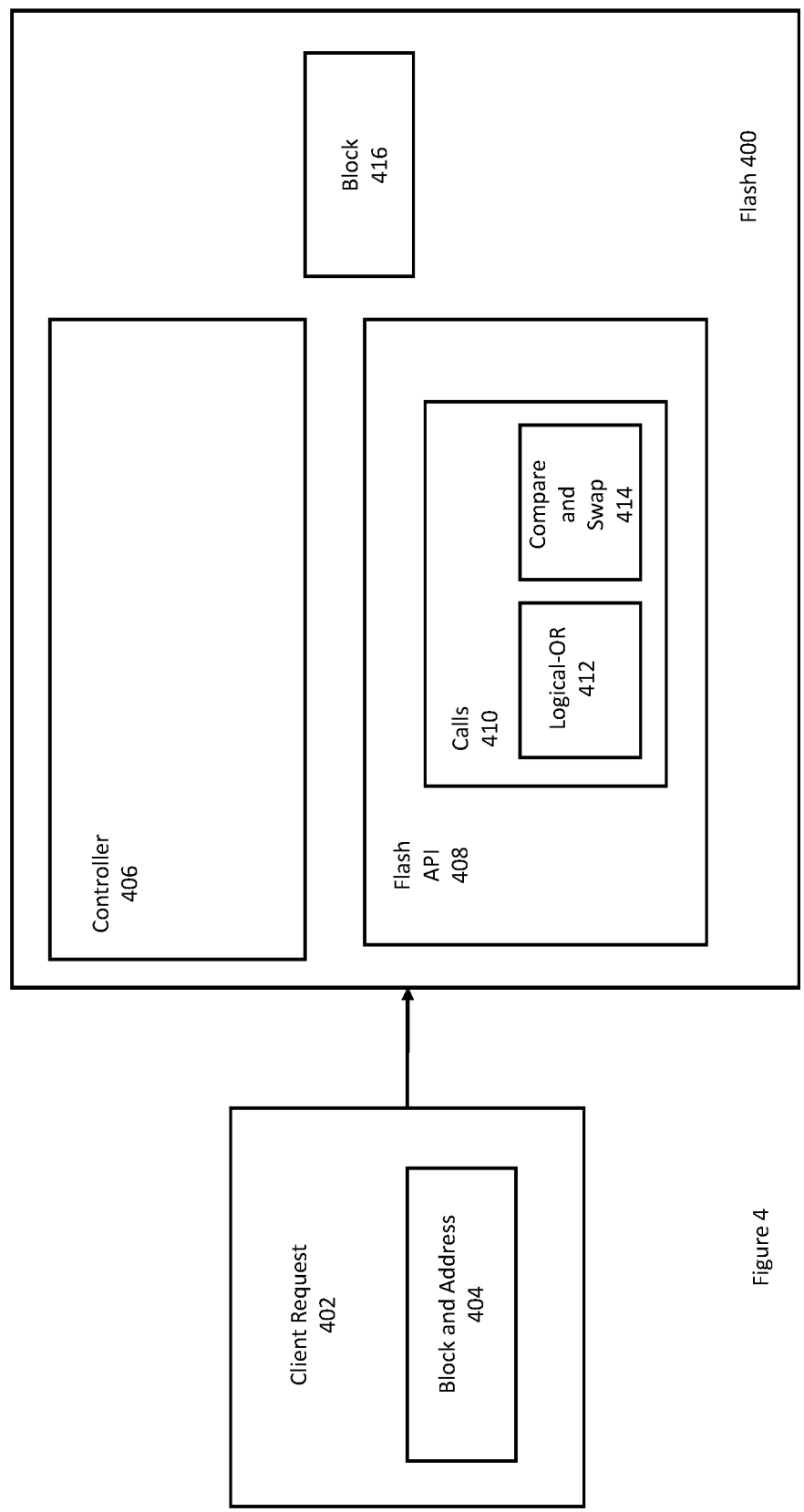
FIG. 4 illustrates an example of an external interface for overwriting portions of a flash memory and for locking portions of the flash memory when performing overwrites.

FIG. 4 illustrates an example of an external interface for overwrites in a flash memory. FIG. 4 illustrates a flash memory 400, which is an example of the flash memory 106 in FIG. 1. The flash memory 400 includes a controller 406 and an API 408. The API 408 includes calls 410 including, by way of example, a logical-OR 412 and a Compare and Swap 414.

In contrast to the internal logic illustrated in FIG. 3 (embodiments of the invention may include both internal logic and the external interface), the API allows a client to explicitly call the API 408. The logical-OR call 412 allows a client 402 to provide a block of data and an address 404. A logical OR is performed between the page or pages at the address provided in the client request 402 with the block 416 at the specified address. This call compares or performs a logical OR with each respective bit. A logical OR has the property that it never changes a one to a zero, but zeros may be changed to one if they are ORed with a one. This operation is an overwrite that potentially replaces 0s in the block 416 to 1s. The client may be aware, prior to making the call, that the necessary updates to the block 416 can be achieved with the logical OR operation. Depending on hardware capabilities, a logical OR operation may not be required for each bit. Rather, the logical OR effectively changes 0s in to the block 416 to 1s based on the contents of the block provided in the client request 402. Thus, the logical OR may simply identify the bits to be changed to is and make those changes. If the hardware is configured such that an entire page is written at a time, then the page is written such that the relevant 0s are changed to 1s.

The compare and swap call 414 can be used for locking and for thread synchronization when performing overwrites. When making a compare and swap call 414, the client may provide a previous version of a block and a new version of the block. The new version may have new bits set. The controller 406 may then compare the previous version included in the request with the block 416 to insure that another client has not changed the block. If the comparison between the previous version included in the request and the block is equal and if the comparison only results in setting 0s to 1s, the block 416 can be overwritten (e.g., by using logical-OR operation) with the new version included in the client request 402. Other callers attempting to impact or alter block 416 will be blocked until this compare and swap operation completes. Thus, the controller 406 may also lock locations in the flash memory 400 that are being updated or changed in accordance with the controller logic or API calls 410. A compare and swap operation may thus use a locking data structure.

The calls and logic discussed herein may be implemented with computer executable instructions and the controller 406 and/or the flash memory 400 are examples of a computing device. The calls and logic discussed herein may also be used when interacting (e.g., read/write/update) with data structures implemented in a flash memory.

When locking a shared resource (e.g., a shared data structure) in the context of multiple or parallel threads or processes, the first thread to make a request typically succeeds in gaining access to the shared resource. Threads or processes attempting to access the same shared resource are blocked or placed on hold as long as the first thread has access to the shared resource.

The ability to lock a shared resource can be achieved using a locking data structure. The locking data structure may also be implemented in the flash memory. Each object or data structure or shared resource may be associated with a locking data structure. Alternatively, specific address ranges or blocks of memory can be associated with a locking data structure. This could potentially allow two threads to simultaneously update the same shared resource (e.g., a data structure) in the context of an overwrite operation. For example, a first set of pages in the shared resource may be associated with a first locking data structure and a second set of pages may be associated with a second locking data structure. Thus two threads could update the shared resource at the same time because each is updating a different part of the shared resource.

In one example, the locking data structure may be a series of bits. The locking structure may include one or more pages. The locking data structure may be implemented as an array, for example. Initially, all entries in the locking data structure are initially set to zero. When a first thread requests access to a shared resource (e.g., a linked list) associated with the locking structure, the entries in the data locking structure are evaluated. If the number of 1s is 0 or even, then the shared resource is not locked. An overwrite operation is then performed on the locking data structure to set the first bit to a 1. This creates an odd number of 1s in the locking data structure. Threads requesting access to the same shared resource associated with the locking data structure first access the locking data structure. When the number of 1s is odd, access is denied and the shared resource is effectively locked. The locking data structure can ensure that multiple threads do not access the shared resource at the same time and embodiments of the invention can thus prevent data from being corrupted.

When the initial thread that gained access to the shared resource completes the update operation, the locking data structure is overwritten such that another bit is set. This causes the locking data structure to have an even number of 1s, indicating that the associated shared resource is unlocked. Access to the shared resource can then be granted to the next thread requesting access.

This process is repeated until all of the bits in the locking data structure are set. When this condition is achieved, a new locking structure may be instantiated and the old locking data structure may be set for erasure. In one example, an erasure unit may include multiple locking structures. This allows multiple locking data structures to be erased at the same time. The locking data structures may be erased when all locking data structures include is or at an earlier time if desired when less than all of the entries are 1s. When a threshold of 1s is met, the locking data structures may be erased.

Figure 5:
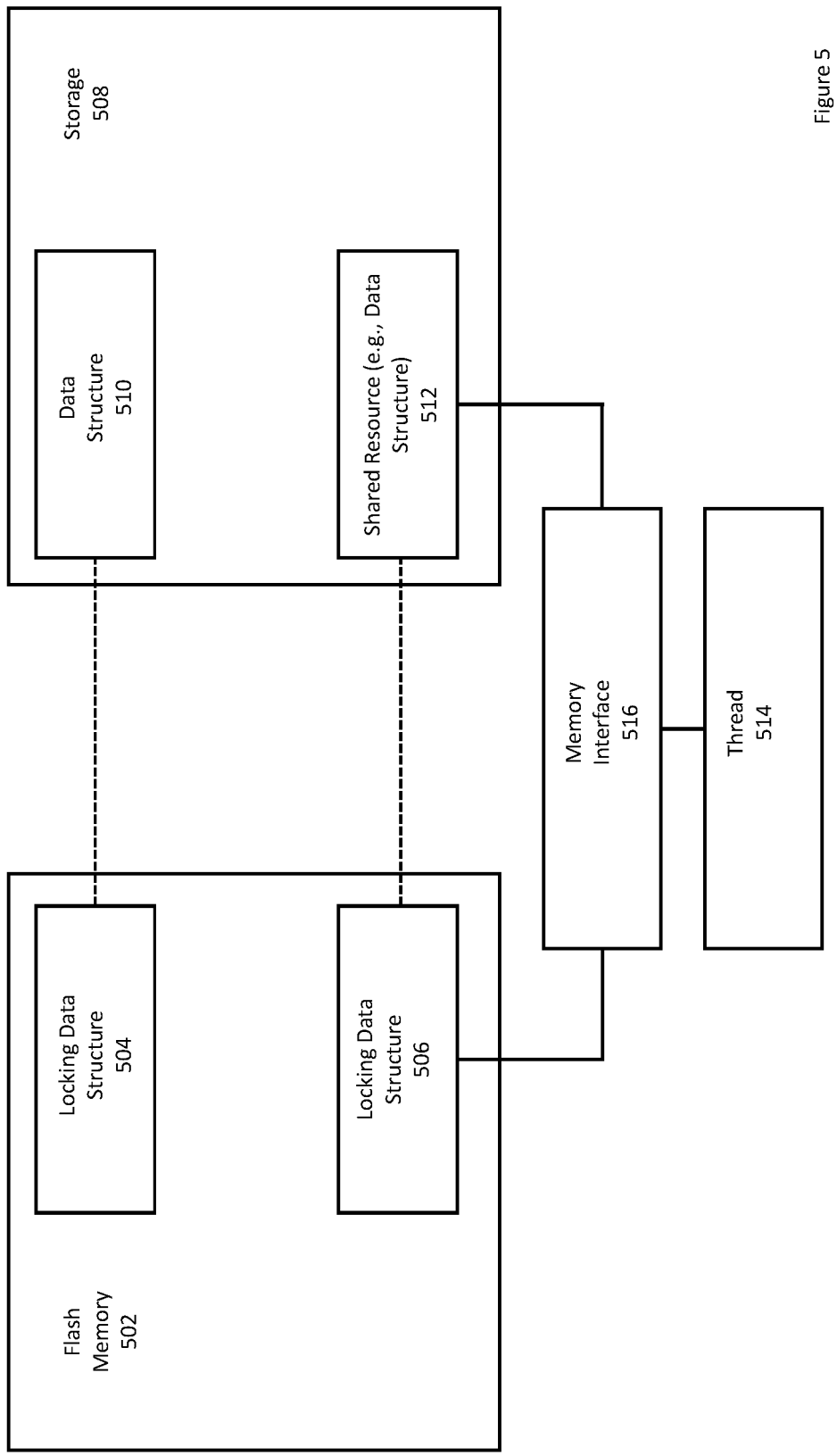
FIG. 5 illustrates an example of a locking data structure implemented in a flash memory.

FIG. 5 illustrates an example of the relationship between locking data structures and shared resources. FIG. 5 illustrates a flash memory 502. Multiple locking data structures, represented by locking data structures 504 and 506, are implemented in the flash memory. Each of the locking data structures 504 and 506 is associated with a shared resource such as a data structure. The locking data structure 504 is used to lock or control access to a shared resource, which may be the data structure 510. The locking data structure 506 is used to lock or control access to the data structure 512, which is another example of a shared resource.

The data structures 510 and 512 are stored in storage 508 (e.g., HDDs) in this example. However, the data structures 510 and 512 could also be implemented in the flash memory 502 or in another memory or location.

When a thread 514 attempts to access the data object 512, for example, a request may be made through a memory interface 516 (e.g., the flash API or flash controller). When a request is received, the locking data structure 506 is evaluated to determine whether the data structure 512 is locked. An odd number of 1s in the locking data structure indicates that the data structure 512 is locked and the request is denied or placed on hold until the data structure 512 is unlocked. An even number of 1s (or zero 1s) indicates that the data structure 512 is unlocked. In this case, the locking structure is atomically updated or overwritten (such as by using a compare-and-swap operation) so that it includes an odd number of 1s and the request to access the data structure 512 is granted. When the operation performed by the thread 514 is complete, the locking structure 506 is updated to reflect that the data structure 512 is now unlocked, for example, by causing the locking data structure to have an even number of 1s. An atomic operation, which may be used when setting bits in the locking data structure 506, is an operation that guarantees isolation from other processes. Thus, the locking data structure can be changed only by one process or thread at a time.

Figure 6:
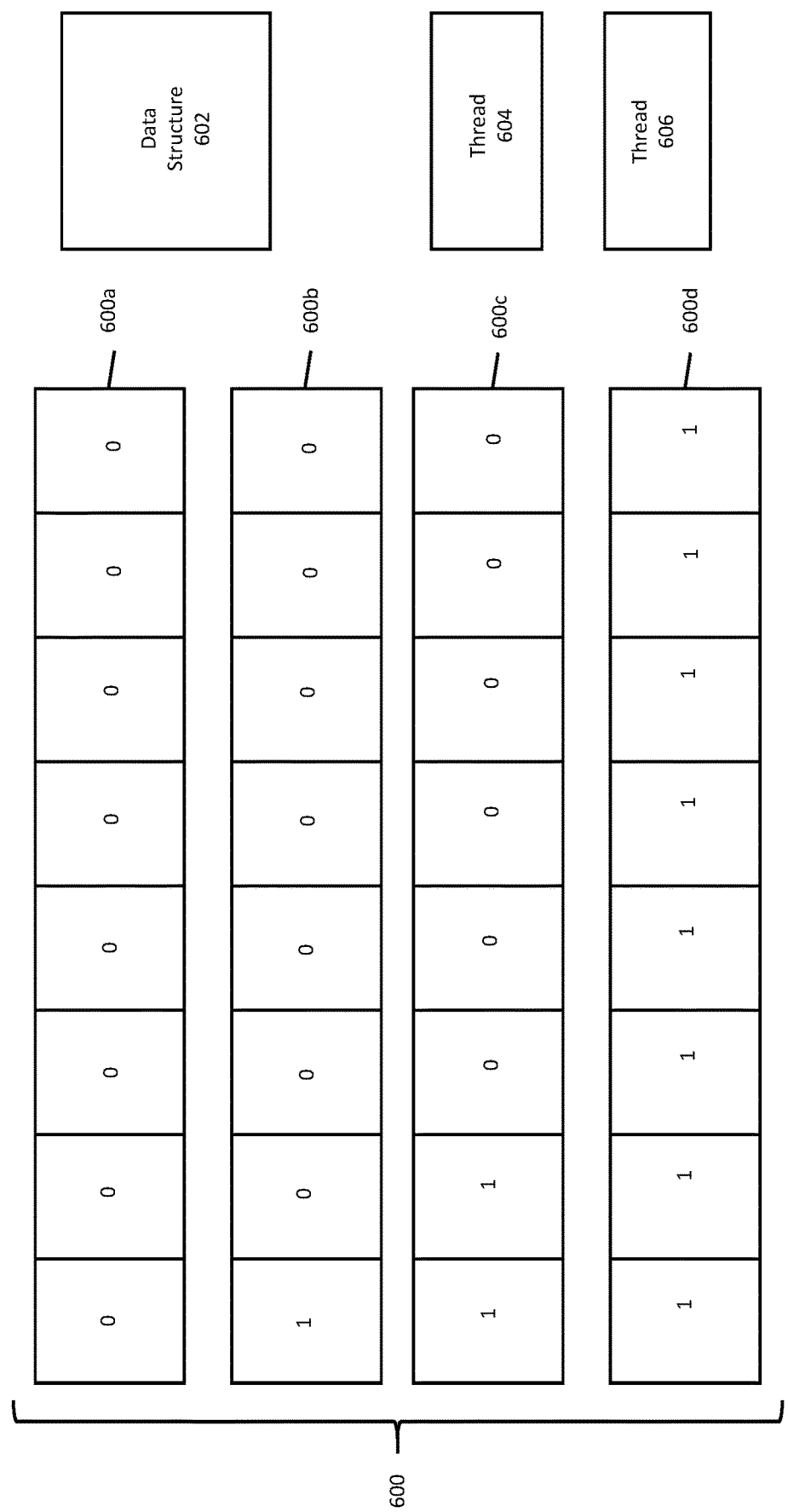
FIG. 6 illustrates another example of a locking data structure implemented in a flash memory.

FIG. 6 illustrates an example of changes to a locking data structure over time. FIG. 6 illustrates a locking data structure 600 at different points in time 600a, 600b, 600c and 600d. The locking data structure is used to lock or control access to the data structure 602. In one example, all changes to the locking data structure are made using an atomic operation to ensure that the changes are isolated from other operations that may desire access to the shared resource associated with the locking data structure.

The locking data structure 600a represents the initial state of the locking data structure 600. All entries in the locking data structure 600a are initially 0. At some point in time after the locking data structure 600a, the thread 604 requests access to the data structure 602. Because all entries are 0, access is granted and the locking data structure is overwritten to include an odd number of 1s, as illustrated in the locking data structure 600b. This may be achieved by setting the first bit or the last bit or any bit. At some point in time after the locking data structure 600b, the thread 606 requests access to the data structure 602. The data structure 600b is then examined. Because the locking data structure 600b includes an odd number of 1s, the request of the thread 606 is denied.

The requests from the threads 604 and 606 may occur very close in time when the threads are operating concurrently. Only the first thread to request access, however, is granted access to the data structure 602. When the thread 604 finishes with the data structure 602 (e.g., finishes writing data), the locking data structure 600 is changed or overwritten such that it includes an even number of 1s as illustrated in the locking data structure 600c. Because the locking data structure includes an even number of 1s, the next thread to request access to the data structure 602 is granted access.

Eventually, all of the bits in the locking data structure 600 are set to 1 s as illustrated in the locking data structure 600d. At this point, it is necessary to create a new locking data structure for the data structure 602 or to erase the data structure 600 so that all of the 1s are unset to 0s.

Figure 7:
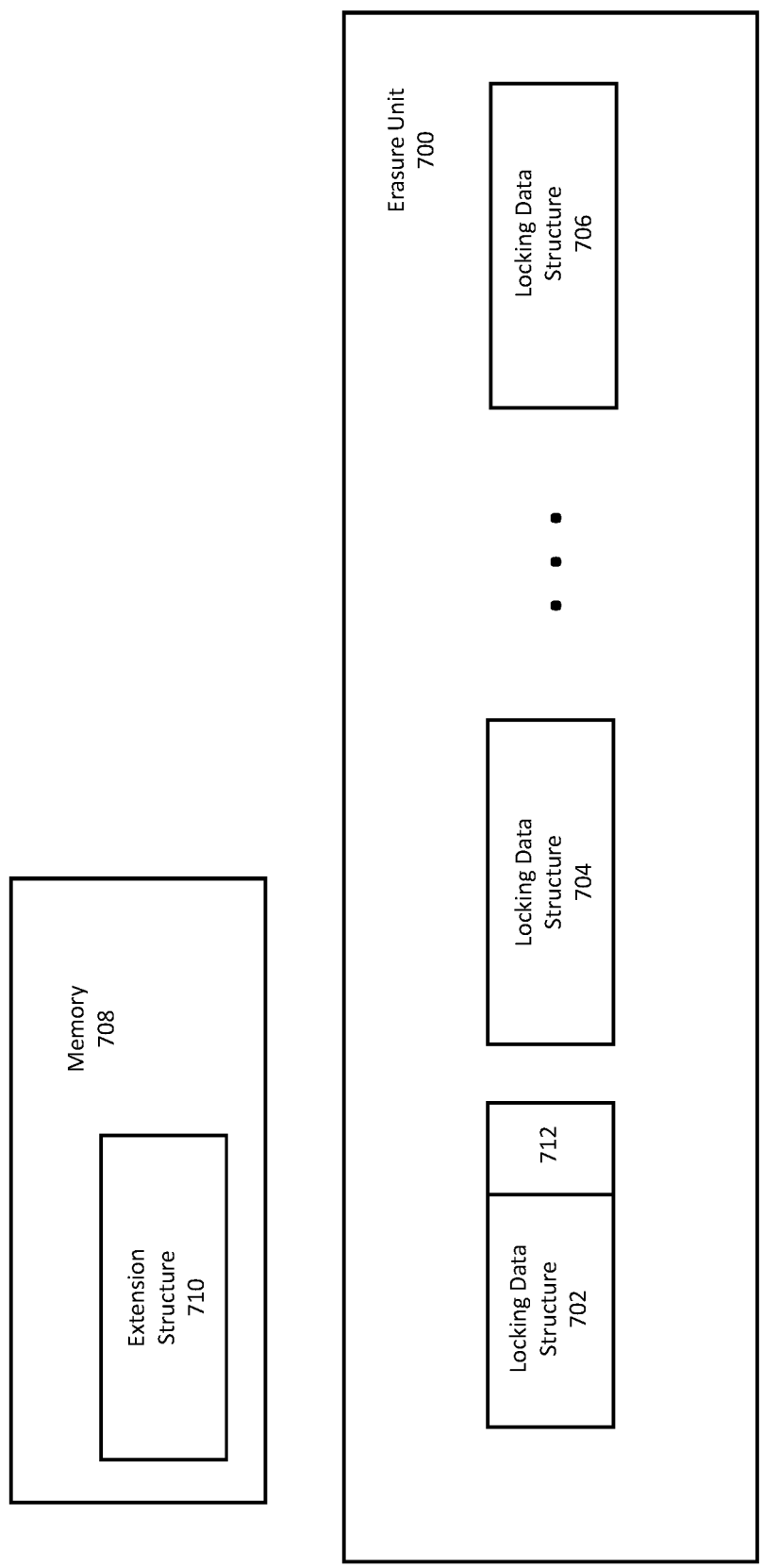
FIG. 7 illustrates an example of multiple locking data structures implemented in a flash memory.

FIG. 7 illustrates an example of an erasure unit that includes locking data structures 702, 704, and 706. Each of the locking data structures 702, 704, and 706 may be associated with a different shared resource. This arrangement allows multiple locking data structures to be erased or reset at the same time. The locking data structures in the erasure unit 700 may be erased or reset whenever one of the locking data structures includes all 1 s. However, the locking data structures 702, 704, and 706 are evaluated prior to erasing the erasure unit. For example, if the locking data structure 702 indicates that a shared resource associated with one of the data locking structures is locked, erasing all of the locking data structures could compromise the shared resource that is locked. Thus, the locking data structures may not be collectively erased until all of the locking data structures indicate that all of the associated shared resources are unlocked.

In one example, the locking data structure may extend to memory 708 such as DRAM. The extension structure 710 may be an extension of the locking data structure 702. The locking data structure 702 may include an extension bit 712. The extension bit 712 is set when all of the other bits in the locking data structure 702 are 1s. This indicates to a process or thread that the extension structure 710 is present in the memory 708. This allows more time for more of the bits in all of the locking data structures 702, 704 and 706 to be set before erasing the erasure unit 700.

Alternatively, the locking data structure can be restarted at a new location in the flash memory. The other locking data structures may be restarted in new locations when they become full of 1s. This allows the locking data structures to be arranged in a manner that facilitates their erasure. Further this allows all of the locking data structures to be fully used before being erased and ensures that the locking data structures are not erased prematurely (e.g., when being used to lock a shared resource). Alternatively, the locking data structures may be instantiated in other arrangements.

FIG. 8 is an example of a flow diagram for controlling access to a data structure or, more generally, to a shared resource. In box 802, a request to access a shared resource is received. The request may include sufficient information to identify the location of the shared resource as well as an offset or other reference into the shared resource. If the shared resource is not data in memory, the request may include other parameters necessary to identify the shared resource (e.g., a network port, device, or the like). The request may include a previous version of data and a new version of the data to be written to the flash memory. The request may identify, for example, a specific page or block based on an address. The request may be sent by a client (e.g., a process, thread, application, or the like) and may be received by a memory interface (e.g., a flash memory API or a flash controller or the like)

In box 804, the lock status of the shared resource that the client is attempting to access or use is determined. This may be performed by evaluating a locking data structure associated with the requested shared resource. In one example, the number of 1s in the locking data structure determines whether the requested shared resource is locked. Zero or an even number of 1s indicates that the shared resource is unlocked while an odd number of 1s indicates that the data structure is locked.

When the locking data structure indicates that the shared resource is unlocked, the locking data structure is updated in box 806 to reflect that the shared resource is locked. This may include overwriting the locking data structure or a portion of the data structure (e.g., a page) such that at least one bit is set during the overwrite operation. If a logical OR is performed, the contents of the data ORed with the locking data structure can be determined based on the current contents of the locking data structure. This ensures, for example, that one more bit is set. This causes the number of set bits (1s) in the locking data structure to be odd such that other clients are denied access to the shared resource.

In box 810, access is granted to the client after the shared resource is locked and the client that locked the shared resource may perform the operation on or use the shared resource. In box 808, when the lock status is locked, the client is required to wait until the shared resource is unlocked. For example, the request of the client may be queued or retried a certain number of times. If the request fails, the requesting client may be required to make a new request in box 802. As illustrated in FIG. 8, any client that is denied access to the shared resource in box 808 makes a new request to access the shared resource in box 802.

In box 812, once the operation performed by the client is completed, the data locking structure is updated such that it contains an even number of 1s. This may include another overwrite operation such as a logical OR operation or a compare and swap operation on the locking data structure.

The operations used to update shared resources or the locking data structure may be performed at different granularities. In one example, the API may perform a compare and exchange or swap operation at a page granularity.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, DRAM, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein. A controller may include a processor and memory and/or other computing chips.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for locking a shared resource that is available to multiple clients using a locking data structure in a flash memory, the method comprising:
    receiving a request to access a shared resource from a client;
    determining a lock status of the shared resource from a locking data structure associated with the data structure;
    updating the locking data structure when the shared resource is unlocked by overwriting at least a portion of the locking data structure such that the number of 1s in the locking data structure after performing the overwrite operation is odd such that the locking data structure indicates that the shared resource is locked, wherein overwriting, at least a portion of the locking data structure includes performing, a logical OR or performing, a compare-and-swap operation on the locking, data structure and wherein the locking data structure is overwritten with a value that causes only one bit so be set from a 0 to a 1 in the locking data structure; and
    updating the locking data structure such that the locking data structure indicates that the shared resource is unlocked after the client finishes performing operations on or using the shared resource.

2. The method of claim 1, further comprising performing at least one operation on the shared resource.

3. The method of claim 1, further comprising determining whether the number of 1s in the locking data structure is even or odd to determine the lock status and determining that the lock status is unlocked when the number of 1s is 0 or even and determining that the lock status is locked when the number of 1s is odd.

4. The method of claim 1, wherein updating the locking data structure when the data is locked includes overwriting at least a portion of the locking data structure such that the number of 1s in the locking data structure is even after the client finishes performing the operations.

5. The method of claim 1, further comprising receiving a second request to access the data structure from a second client and denying the second request when the locking data structure indicates that the data structure is locked.

6. The method of claim 5, further comprising receiving a subsequent request from the second client to access the data structure, wherein the subsequent request is denied until the locking data structure indicates that the data structure is unlocked.

7. The method of claim 5, further comprising evaluating the locking data structure when determining whether to deny or grant the second request.

8. The method of claim 1, wherein the locking data structure is included in an erasure unit that includes a plurality of locking data structures, the method comprising erasing the plurality of locking data structures when none of the plurality of locking data structures indicates that a corresponding shared resource is locked and when a threshold amount of the plurality of locking data structures has been used.

9. The method of claim 8, further comprising extending the locking data structure to an in-memory extension structure or beginning a new locking data structure in a new location in the flash memory when the locking data structure is fully used.

10. The method of claim 1, wherein the shared resource comprises at least one of a data structure stored in the flash memory, a data structure stored in a different memory, a hardware resource, or a network resource.

11. A non-transitory computer-readable medium including instructions for performing the method of claim 1.

12. A method for locking a shared resource that is available to multiple clients using a locking data structure in a flash memory, the method comprising:
    receiving a request to access a shared resource from a client;
    determining a lock status of the shared resource from a locking data structure associated with the data structure;
    updating the locking data structure when the shared resource is unlocked by overwriting at least a portion of the locking data structure such that the number of 1s in the locking data structure after performing the overwrite operation is even such that the locking data structure indicates that the shared resource is locked, wherein overwriting at least a portion of the locking data structure includes performing a logical OR or performing a compare-and-swap operation on the locking data structure and wherein the locking data structure is overwritten with a value that causes only one bit so be set from a 0 to a 1 in the locking data structure; and updating the locking data structure such that the locking data structure indicates that the shared resource is unlocked after the client finishes performing operations on or using the shared resource.

13. The method of claim 12, further comprising performing at least one operation on the shared resource.

14. The method of claim 12, further comprising determining whether the number of 1s in the locking data structure is even or odd to determine the lock status and determining that the lock status is locked when the number of 1s is even and determining that the lock status is unlocked when the number of 1s is odd, wherein the locking data structure is initialized to have 1 bit set indicating an unlocked lock status for the shared resource.

15. The method of claim 12, wherein updating the locking data structure when the data is locked includes overwriting at least a portion of the locking data structure such that the number of 1s in the locking data structure is odd after the client finishes performing the operations.

16. The method of claim 12, further comprising receiving one or more subsequent requests to access the data structure from a second client and denying the one or more subsequent requests when the locking data structure indicates that the data structure is locked.

17. The method of claim 12, wherein the locking data structure is included in an erasure unit that includes a plurality of locking data structures, the method comprising erasing the plurality of locking data structures when none of the plurality of locking data structures indicates that a corresponding shared resource is locked and when a threshold amount of the plurality of locking data structures has been used.

18. The method of claim 17, further comprising extending the locking data structure to an in-memory extension structure or beginning a new locking data structure in a new location in the flash memory when the locking data structure is fully used.

19. The method of claim 12, wherein the shared resource comprises at least one of a data structure stored in the flash memory, a data structure stored in a different memory, a hardware resource, or a network resource.

20. The method of claim 1, further comprising updating the data structure with an atomic operation, wherein the atomic operation isolates the locking data structure from other clients while the locking data structure is updated.

* * * * *